United States Patent [19]

Kneib

[11] Patent Number: 4,641,238
[45] Date of Patent: Feb. 3, 1987

[54] MULTIPROCESSOR SYSTEM EMPLOYING DYNAMICALLY PROGRAMMABLE PROCESSING ELEMENTS CONTROLLED BY A MASTER PROCESSOR

[75] Inventor: Kristine N. Kneib, San Diego, Calif.

[73] Assignee: ITT Corporation, New York, N.Y.

[21] Appl. No.: 680,107

[22] Filed: Dec. 10, 1984

[51] Int. Cl.[4] .............................................. G06F 15/16
[52] U.S. Cl. ...................................................... 364/200
[58] Field of Search ................................. 364/200, 900

[56] References Cited

U.S. PATENT DOCUMENTS 4,439,839 3/1984 Kneib et al. ......................... 364/900

Primary Examiner—Raulfe B. Zache
Attorney, Agent, or Firm—John T. O'Halloran; Thomas F. Meagher

[57] ABSTRACT

There is disclosed a multiple processor system which employs dynamically programmable processing elements (DDPE) utilized as slave devices and under the control of a master processor. A plurality of DPPE's have input/output data lines connected to a digital signal processing (DSP) bus. Communication between the DPPE's is afforded via the (DSP) bus from a master processor which interfaces with the bus via a dual port memory designated as a global memory. Each DPPE is connected together via another bidirectional serial bus so that the individual DPPE's can communicate one with the other in regard to processing and exchanging of arithmetic data. The digital signal processing bus allows the master processor to interface with the DPPE devices for control of input/output and control functions. In this manner, the master processor interfaces directly with a codec and has outputs which allow the transmission of plaintext or ciphertext data which data is formed by arithmetic operations performed by the slave DPPE's. The master processor also accesses a host computer and user terminal via a deuce circuit which essentially is a dual enhanced communications element. The status of the DPPE's and priority between the DPPE's and the master processor is controlled by an arbiter circuit which essentially controls the access of the DPPE's to the dual port memory (global memory) via the digital signal processing bus. The system is employed to operate on complicated algorithms and is patricularly adapted for use as a voice processor or modem processor is regard to modem communications systems.

20 Claims, 6 Drawing Figures

ENLARGEMENT OF MEMORY MAPPED I/O SPACE
ie. A000-BFFF OF DATA MEMORY

| | |
|---|---|
| A0XX | RESET LOGIC ANALIZER INTERRUPT |
| A2XX | TRANSMIT (WR) /RECEIVE (RE) A |
| A3XX | MODE/COMMAND (WR)/STATUS (RE) A    A: USER'S TERMINAL |
| A4XX | TRANSMIT (WR)/RECEIVE (RE) B |
| A5XX | MODE/COMMAND (WR)/STATUS (RE) B    B: HOST MACHINE |
| A6XX | BAUD RATE A (WR ONLY) |
| A7XX | BAUD RATE B (WR ONLY) |
| A8XX | READ CODEC |
| AAXX | WRITE CODEC |
| ACXY | WRITE CONSTELLATION DISPLAY (Y=0 X AXIS / Y=1 Y AXIS) |
| AEXX | LS BYTE STATUS OUT |
| B0XX | MS BYTE STATUS OUT |
| B2XX | LS BYTE STATUS IN |
| B4XX | MS BYTE STATUS IN |
| B6XY | WRITE 4 DISPLAYS (Y=0,1,2,3) |
| B8XX | ASSERT 32020 HOLD |
| BAXX | DEASSERT 32020 HOLD |
| BCXX | RESET DEUCE |
| BEXX | BLANK Z-ANS CONSTELLATION DISPLAY |

Fig. 4(B)

PLAIN TEXT TRANSMIT

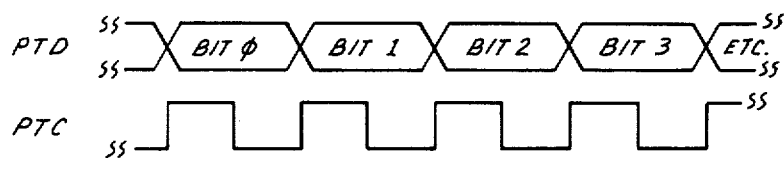

PLAIN TEXT RECEIVE

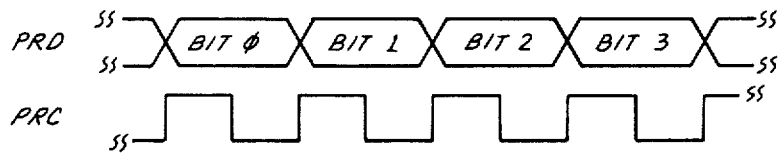

Fig. 2

MULTIPROCESSOR SYSTEM EMPLOYING DYNAMICALLY PROGRAMMABLE PROCESSING ELEMENTS CONTROLLED BY A MASTER PROCESSOR

BACKGROUND OF THE INVENTION

This invention relates to a digital processing system which system is capable of processing large quantities of voice, sonar, radar, video and other types of analog signals and to operate on these signals by performing complicated arithmetic operations in general and more particularly to such a system and architecture to enable the processing of analog signals to provide digital signals which can be employed for narrow band secure communications and voice recognition.

As one can readily perceive, the field of digital signal process (DSP) is extremely complicated, and many systems exist which essentially operate on analog signals to provide bandwidth reduction and to enable digitized encrypted representatives of the analog signal to be sent over conventional communication channels.

The analog signals are operated on by the digital signal processing circuitry by subjecting the signals to algorithms. The algorithms employed can be quite complicated. For example, a technique that is widely employed is referred to as linear predictive coding (LPC). Essentially, LPC is used to model the vocal tract with a multisection all pole filter to synthesize the voice on the receiving end. These filter coefficients are derived by analyzing the voice at the transmitter by several different techniques. One technique employed is the covariance method whereby a $10 \times 10$ covariance matrix is generated and the filter coefficients are derived by Cholesky decomposition.

In addition to the filter coefficients, the pitch periods of the speech are derived by typically autocorrelation of the digitized voice samples or by an absolute magnitude difference function. As indicated these techniques have been fairly well documented, and for example of the mathematics involved and to be handled by such systems, reference is made to an article entitled SPEECH ANALYSIS AND SYNTHESIS BY LINEAR PREDICTION OF THE SPEECH WAVE by B. S. Atal and S. L. Haneuer, published in the JOURNAL OF THE ACCOUSTICAL SOCIETY OF AMERICA 50,2 (1971) pages 637 to 655.

See also the following articles A LEVEL COMPLETING DYNAMIC TIME WARPING ALGORITHM FOR CONNECTED WORD RECOGNITION by C. S. Myers and L. R. Rabiner published in IEEE TRANSACTIONS ON ACCOUSTIC SPEECH AND SIGNAL PROCESS, Vol. ASSP-29 No. 2,(April 1981). As one can ascertain by these articles and a number of others, the circuitry for operating on analog signals using LPC techniques is extremely complicated and by the use of computers involves extremely large memories which often are implemented by adjunct devices such as magnetic tape, disks and so on.

Apart from the above processing techniques, there is a field of information transfer which is referred to as data encryption. Cryptography is the science of transforming messages for the purpose of making the message unintelligible to all but the intended receiver of the message. The term data encryption refers to the use of cryptographic methods in communications for the same reasons. The transformation used to encipher a message typically involves both a general method, or algorithm and a key. These systems are also extremely complicated in that the purpose of the system is to prevent an unauthorized user from accessing information which may be transmitted along a conventional communication channel.

According to modern day cryptographic techniques, a number of systems are employed which include public-key cryptosystems using complicated ciphers such as the RSA cipher. Other techniques are based on the difficulty of determining which subset of a given list of numbers adds up to a given target number. In these systems, both the enciphering and deciphering of data involves arithmetic operations which are manifested in the use of extremely large digital numbers, that is, numbers having a large number of bits where these numbers may be continuously raised to appropriate powers employing modular arithmetic and other sophisticated mathematical techniques.

See for example an article entitled A METHOD FOR OBTAINING DIGITAL SIGNATURES AND PUBLIC-KEY CRYPTOSYSTEMS by R. Rivest, A. Shamir and L. Adleman, published in COMMUNICATIONS ACM, pages 120 to 126 (February 1978). This is a general treatise concerning such systems and the mathematical approaches. See also an article entitled PRIVACY AND AUTHENTICATION: AN INTRODUCTION TO CRYPTOGRAPHY by W. Diffie and M. Hellman, published in the PROCEEDINGS OF THE IEEE, Vol. 67, (March 1979) pages 397 to 472. Essentially, based on modern communication techniques, it is apparent that these digital signal processing applications impose requirements that exceed the capabilities of any available signal chip signal processor such as those presently commercially available. The prior art, cognizant of these techniques, attempted to solve these problems by using multiple types of chips—such as bit-slice chips, wide memory configurations, multiplier-accumulators and a large quantity of MSI/SSI glue logic. These techniques were implemented in an attempt to build a processor unit having more arithmetic capability. Thus in these approaches various components require multiple, interconnected integrated circuits.

There has been an approach to alleviate the problem in employing circuit element designated as a dynamically programmable processing element (DPPE). A DPPE is employed in a digital signal processing system or as a digital signal processor (DSP) which requires complicated arithmetic procedures to be implemented and hence for use in the systems described above. The DPPE is a special purpose computer which essentially has a program bus for transmitting and receiving program data from an external source. The unit also includes a data bus which bus can transmit or receive digital data. Coupled between the program and data buses are input and output registers or buffers which are capable of storing transmitted or received data propagating on either of the buses.

The unit typically contains a program memory which has an input coupled to the program bus and an output which can also access the program bus. Apart from the program memory, there is an addressable data memory which can be addressed from the program bus and is operative to transmit data to the data bus. Thus the program memory can receive program information or data from an external source as well as receiving data from the data memory which can also transfer data to the external source. Thus the unit can be reprogrammed in real time by the external source and the DPPE can also execute program instructions by fetching them from the external source as well as executing its own program instructions as stored in its program memory.

Hence the structure and format of the DPPE enables it to interface with an external source such as a microprocessor to assist and perform program instructions as well as to perform arithmetic operations on data from the microprocessor and to communicate with the microprocessor after completion of the various routines. For an example of such a device, reference is made to U.S. Pat. No. 4,439,839 entitled DYNAMICALLY PROGRAMMABLE PROCESSING ELEMENT issued Mar. 27, 1984 to K. N. Kneib and G. Vensko and assigned to the International Telephone and Telegraph Corporation, the assignee herein.

In spite of the improvements offered by the DPPE, many signal processing applications exist which exceed the capability of available commercial integrated circuits, including the DPPE.

Thus it is an object of the present invention to provide a multiple processor architecture which is adapted to process digital signals and which employs a plurality of DPPE's under control of a master microprocessor. In regard to such systems, the multiple processor system, according to this invention, can be employed to solve full-duplex LPC voice and modem algorithms as well as to be used to perform data encryption utilizing complicated cipher algorithms. The same architecture can be used for implementing other communications speed and speaker recognition algorithms which require extensive processing in implementing the arithmetic operations.

Thus according to the system architecture to be described, all such complicated digital signal processing techniques can be accommodated by simply adding additional modules to the system architecture of this invention.

BRIEF SUMMARY OF THE INVENTION

A multiple processor apparatus particularly adapted for use in providing digital signals according to complicated algorithms, comprising a plurality of dynamically programmable processing elements (DPPE) means, each capable of processing input data in accordance with arithmetic computations to be performed on said data, and each having a bidirectional serial input/output port and a bidirectional parallel input/output port, a first bus coupled between said serial ports of said DPPE's for enabling transfer of data between each of said plurality of DPPE elements, a second digital signal processing bus coupled to the parallel ports of said plurality of DPPE element means, global memory means having parallel input/output port coupled to said second bus and another input/output (second) port, a master processor having a bidirectional input/output port coupled to said second port of said global memory for controlling the data to be transmitted via said memory means to said second bus and for receiving data from said second bus as processed by said DPPE's, said master processor having a plurality of bidirectional input/output lines for selectively receiving or transmitting data and for controlling the status of said lines according to the arithmetic computations performed by said plurality of DPPE's.

BRIEF DESCRIPTION OF THE FIGURES

FIG. 2 is a series of timing diagrams depicting the characteristics of the plaintext input/output signals developed by such a processor.

FIGS. 4a and 4b are a detailed memory map for a master processor employed in this invention.

DETAILED DESCRIPTION OF THE FIGURES

Figure 1:
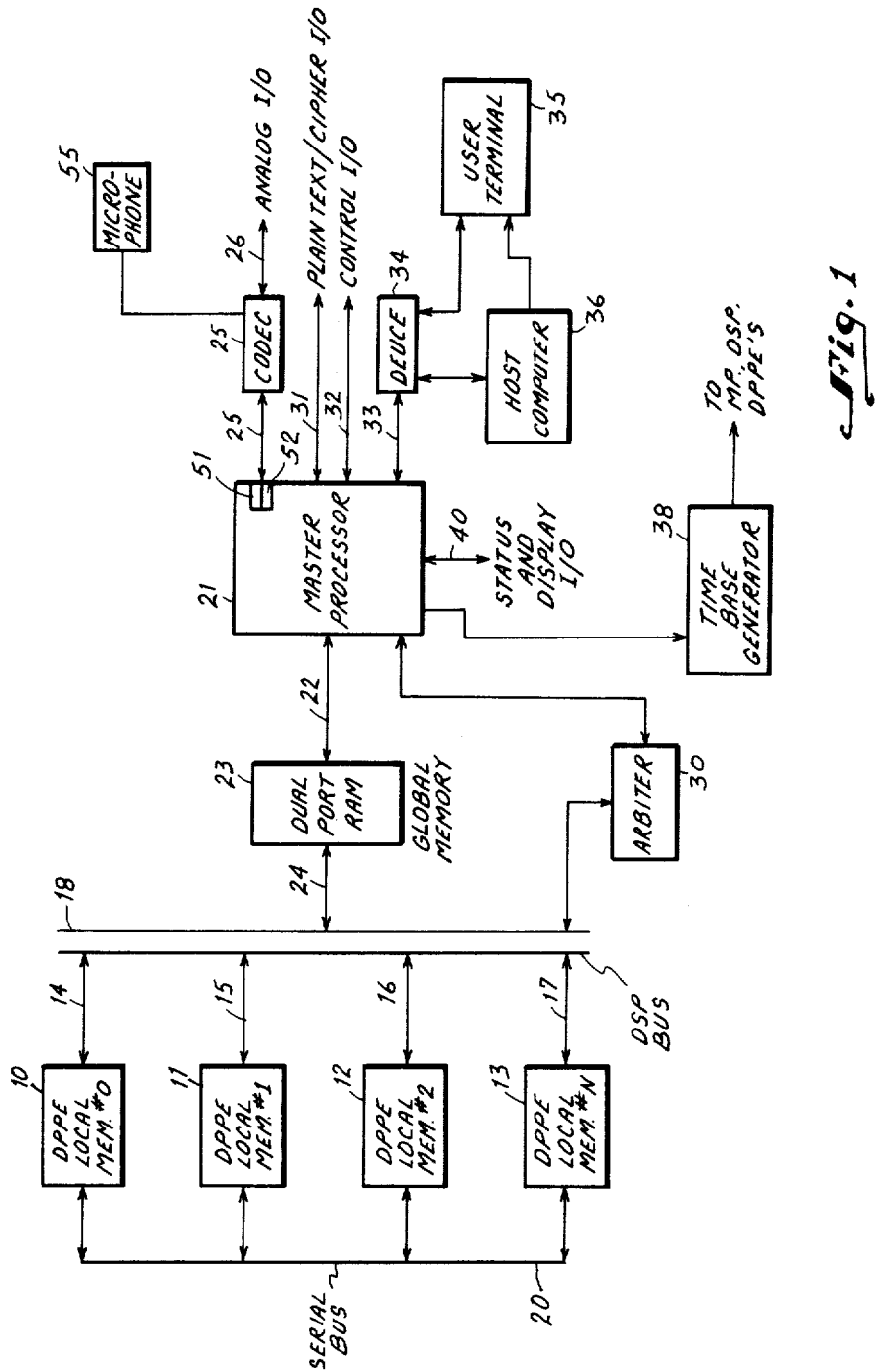
FIG. 1 is a block diagram depicting a multiple processor system apparatus according to this invention.

Referring to FIG. 1, there is shown a multiple processor system according to this invention.

As seen in FIG. 1, a plurality of DPPE's designated as 10 to 13 are depicted. Each DPPE as will be explained may have the architecture or structure as shown in the above noted patent U.S. Pat. No. 4,439,839. In any event, dynamically programmable processing elements are commercially available and are supplied by many manufacturers.

FIG. 1 shows four DPPE's as 10 to 13 connected in parallel. It is understood that this number is by way of example and less or more units can be added or removed as a function of system requirements. As indicated above, the DPPE device contains local memories which for example may include a program memory, a data memory as well as appropriate RAM and ROM memories and as shown in the above noted patent.

Each DPPE as 10 to 13 has an associated input/output data bus as 14 to 17 which is coupled to a common data bus 18 designated as the DSP bus or the digital signal processing bus. Each DPPE functions as a slave processor and can communicate one with the other through a common bidirectional serial bus 20. The serial bus as will be explained functions to allow the DPPE devices to communicate while the DSP bus 18 allows for the transfer of data between the DPPE devices and a master processor or microprocessor 21. As will be explained, the microprocessor 21 is also a conventional unit which may be an 8-bit processor such as the Zilog microprocessor, the Z8613. Essentially, the function of the master processor 21 and its local memories operate as a second processing site which is dedicated to the analog and digital input/output processing and processing control. The function of the DPPE devices 10 to 13 are to handle signal processing functions such as the performance of the arithmetic operations on input data which data is selected by the master processor 21.

The architecture as will be described minimizes communications between the processor so that there is no significant time wasted in performing complicated arithmetic processes. The master processor 21 as will be explained is basically dedicated to input/output processing and for implementing control functions. Accordingly, the master processor 21 has a bidirectional bus 22 which is coupled to a dual port RAM 23. The dual port RAM essentially serves as a data/message buffer unit and, as will be further explained, operates to transfer bidirectional signals from/to the master processor to/from the DSP bus 18 via the output/input bus 24. A real time input of the master processor 21 is coupled to a codec circuit 25. The codec circuit 25 is a well known component. Essentially, the term codec stands for Coder/Decoder. Codec circuits are well known in the art as indicated and basically operate to accept analog signals and depending upon the system used to digitize and multiplexes the information to provide at an output a serial bit stream. Hence the main function of the codec is to receive and transmit analog signals. The codec contains an analog-to-digital converter for converting received analog signals to digital signals for input to the master processor 21 via the bidirectional bus 25. The codec will also receive digital signals from the master processor 21 which digital signals are decoded and converted into analog signals via a digital-to-analog converter and are then impressed upon the output line 26 designated as analog I/O where I/O is to designate input/output.

As indicated, the term codec is a generic term and the functions of such units as well as their structural configurations are well known in the art. See for example, a text entitled TELECOMMUNICATION SYSTEM ENGINEERING by Rober L. Freeman, published by John Wiley and Sons, Inc. (1980) Chapter 9, entitled DIGITAL TRANSMISSIONS AND SWITCHING SYSTEMS, pages 358–360. In the text a simplified functional block diagram of a PCM codec is shown on page 359. The master processor has an output coupled to an arbiter circuit 30. The function of the arbiter 30 circuit as will be more fully explained is to control the access of the respective DPPE's 10 to 13 to the dual RAM 23 which also is referred to as a global memory. The arbiter monitors the busy or idle conditions of the DPPE 10 to 13 and under control of the master processor 21 via the DSP bus. Thus the function of the arbiter essentially is to determine which of the DPPEs is to be utilized in a bit computation process and also determines whether priority should be given to the master processor 21 or the DPPE's. As will be explained, for the dual port memory RAM 23, the arbiter 30 gives priority to the master processor 21 which operates in a synchronous interface to the memory 23. The DPPE devices 10 to 13 operate in an asynchronous mode in regard to the dual port RAM 23.

The master processor 21 as indicated controls input/output conditions for the system and has a bidirectional bus 31 designated as plaintext/cipher. The function of this bus is to transmit either a plaintext digital code or a cipher code depending on whether the structure depicted operates as a voice processor or a modem processor. Another output to be explained is indicated by bidirectional bus 32 and emanates from the master processor 21. This is designated as a control I/O. A further output which is manifested by a bidirectional buss 33 is coupled to a deuce circuit 34. Essentially, a deuce circuit is a well known component and deuce is an acronym for a dual enhanced universal communications element. The deuce circuit 34 is used for downloading and editing data and programs that are stored in the external memories associated with the DPPE's 10 to 13 and with the master processor 21. The deuce circuit interfaces with a user terminal 35 which may for example be a telephone subset or some other type of user terminal as a computer which generates information to be transmitted in either a plaintext or cipher mode.

Another output of the deuce circuit is directed to a host computer 36 which may be associated with the user terminal 35. The host computer 36 develops further encoded messages at a local level prior to insertion of the messages via the user terminal to the deuce circuit 34 and thence to the master processor 21 via the bidirectional data bus 33.

FIG. 1 also shows a time base generator 38 which essentially provides clocking signals for control of the master processor, the data buses as the DSP 18 as well as the DPPE's and the user terminal. A system for example as shown in FIG. 1 which includes 1 to 4 DPPE's can be used for development and solving of complicated cipher algorithms or LPC algorithms and can accommodate low bit rate speech processing functions as well as automatic speech and speaker recognition algorithms. Essentially, the analog I/O bus 26 provides an analog interface for the system via the codec 25. The analog interface consists of two single-ended analog signals. These receive and transmit analog signals and interface to external analog circuitry that is required for the selected voice or modem operation and are relatively standard circuitry.

The plaintext or ciphertext input/output bus 31 again dependent upon whether the system is operated as a voice or a modem system which transmits either a plaintext or a cipher text according to the mode of operation. For plaintext operation, two separate half duplex data paths are provided for receiving and transmitting data. These normally are referred to in the art as PTD and PRD respectively. The data clocks which are PRC for plaintext receive and PTC for plaintext transmit are supplied by the time base generator 38 of another clock source. PTD is the plaintext transmit data which may be a data signal representing 2.4 Kbps LPC encoded voice data in a secure mode or 64 Kbps PCM encoded voice data for the clear mode. Thus the PTD output from the voice site occurs for positive transitions of the PTC data clock. The term PTC is the plaintext transmit clock which is input to the voice site. It is generated by the modem in the time base generator in the secure voice terminal mode. This clock is a 2.4 Kbps square wave in a secure mode or a 64 Kbps square wave in the clear mode. For half duplex operation, this signal is disabled when the terminal is not transmitting. The PRD signal is the plaintext receive data which is a data signal representing 2.4 Kbps LPC encoded voice data in the secure mode or 64 Kbps encoded voice data in the clear mode. PRD is the input to the voice site and is sampled by the voice site on the negative transistions of PRC. Hence PRC is a plaintext receive clock which is input to the voice site. This clock may be generated by the time base generator 38 in the modem in the secure voice terminal mode. In the secure mode, it is a 2.4 Kbps clock, and in the clear mode, it is a 64 Kbps clock. For the half duplex operation this signal is disabled when the terminal is not receiving.

Referring to FIG. 2, there is shown the timing characteristics of the above noted plaintext signals which would exist on the plaintext bus 31. The cipher text I/O is similar to the plaintext I/O to provide exchange of data where 2.4 Kbps is the secure voice mode and 64 Kbps is the plaintext bypass mode. However, the modem as evidenced by the system of FIG. 1 must accommodate certain delays for ciphertext operation. Essentially, in the ciphertext operation CTD is the ciphertext transmitted data which has the same characteristics as PTD except that the data is encrypted according to a given algorithm during the secure voice mode and is clear during the plaintext bypass mode. CTC is the ciphertext clock and is electrically the same as PTC. CTC is generated by the timing generator 38 and is an output to the voice site. CRD is the ciphertext receive data which has the same characteristics as PRD except that data is encrypted during the secure voice mode and is clear during plaintext bypass made. CRC is the ciphertext receive clock which is electrically the same as PRC. It is a 2.4 Kbps clock in the secure mode and is a 64 Kbps in the clear mode. It is also generated in the modem structure as for example by the time base generator 38 of FIG. 1 and is an output to the voice site.

As shown in FIG. 1, there is a control bus 32 designated as control I/O. Essentially, the processor module or master processor 21 is controlled in the terminal configuration through three signals designated as RXD, TXD and PON. RXD and TXD are asynchronous serial bit streams with a data rate for example of less than or equal to 32 Kbps. RXD is a unidirectional asynchronous signal that is input to the master processor module 21. TXD is a unidirectional asynchronous signal that is generated by the processor 21. These signals are known in the art and are part of the format and protocol associated with the master processor 21 by being employed, and essentially the signals are available from reference to the user's manual associated with the particular microprocessor utilized as the Zilog Z8613.

As indicated in FIG. 1, the master processor 21 controls the operation of the slave devices as DPPE's 10 to 13. Communication between the slave devices and the master processor 21 occurs through the global memory 23 which is direct dual port memory. Thus the DPPE's as 10 to 13 are capable of communication in the following ways. The DPPE requesting to transmit is granted access to the DSP bus, 18, by the arbiter 30. A transmitting DPPE communicates to the global memory 23 thence to the master processor 21 via the bidirectional data bus 22. The master processor 21 then selects via the communication registers in the dual port RAM 23 a receiving DPPE. Hence the receiving DPPE as selected communicates directly with the master processor via the global memory 23 with access to the DSP bus 18 being granted by the arbiter 30.

In a second communication mode each DPPE as 10 to 13 can directly communicate with each other via the serial bus 20. This communication is independent of the DSP bus 18. As indicated, the circuitry or arbiter 30 can accommodate a plurality of DPPE's and controls the access of the DPPE's to the global memory via the DSP bus 18.

In regard to the arbiter circuit 30 for access to he global memory 23, priority is given to the master processor 21 as above indicated. As will be explained, the dual port RAM 23 which is the global memory is a standard conponent and is available as an off-the-shelf integrated circuit chip. Essentially, to accommodate the above noted operation, the left port of the dual port RAM is assigned to the master processor 21. The master processor 21 can also be programmed so that it provides for contention logic operation to determine access priorities for the dual port RAM 23. The contention logic can also be included in the arbiter circuit 30. Contention exists when the address being accessed by both a DPPE and master processor 21 match. In this manner the master processor 21 is given priority. In all other cases contention is handled internal to the dual port memory 23. When contention logic is implemented by circuitry included in the arbiter 30, the master processor 21 requires an extended cycle to operate with the dual port memory 23. If contention logic is not implemented in hardware but in software then the master processor 21 can operate at its regular cycle time rather than with extended cycles from the dual port memory 23.

The DPPE's 10–13 all operate from a crystal controlled oscillator which is part of the time base generator. Thus each of the DPPE modules 10–13 are physically identical.

Figure 3:
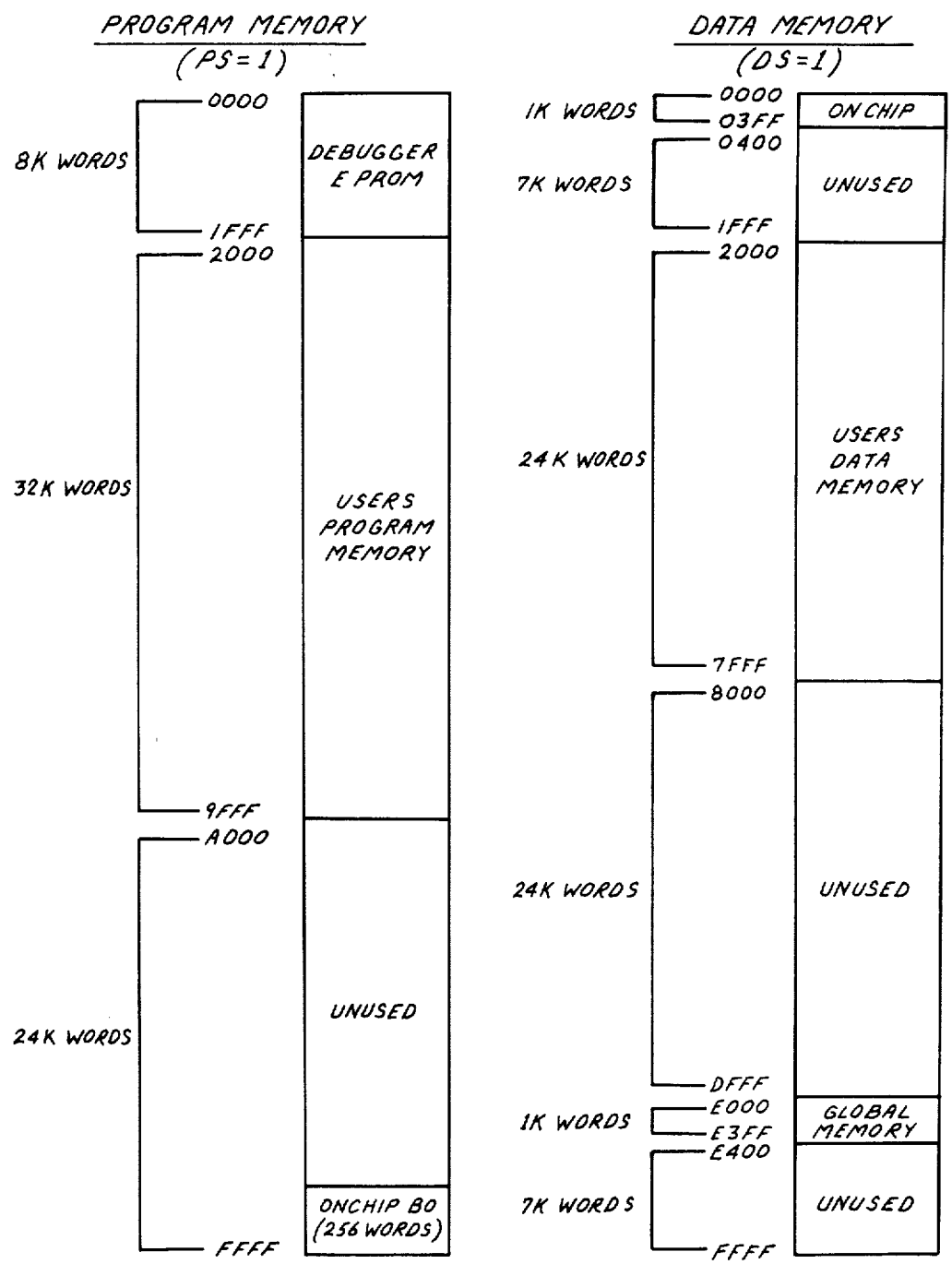
FIG. 3 is a detailed memory map depicting the program memory structure and the data memory structure used for a dynamically programmable processing element employed in this invention.

Referring to FIG. 3, there is shown a memory map for each of the DPPE's as 10 to 13 of FIG. 1. As seen from FIG. 3, the program memory consists of 8 K words of EPROM. These words are used for debugging purposes as for testing and confirming program information. The memory is populated with a second section which consists of 32 K words of program memory RAM. There are 24 K words of data memory RAM and 1 K words of global memory RAM with the DPPE being assigned to the right port of the dual port memory 23. The DPPE as indicated has a local external memory which essentially constitutes a separate data and program memory section. The data memory of the DPPE is implemented in RAM and the program memory is a combination of EPROM and RAM. It is understood that the term RAM is well known and refers to a random access memory, while the term EPROM refers to an erasable programmable read only memory. Suitable memory structures are well known.

See for example a text entitled ELECTRONIC COMPUTER MEMORY TECHNOLOGY by W. B. Riley, published by McGraw Hill Book Company (1971).

Figure 4A:
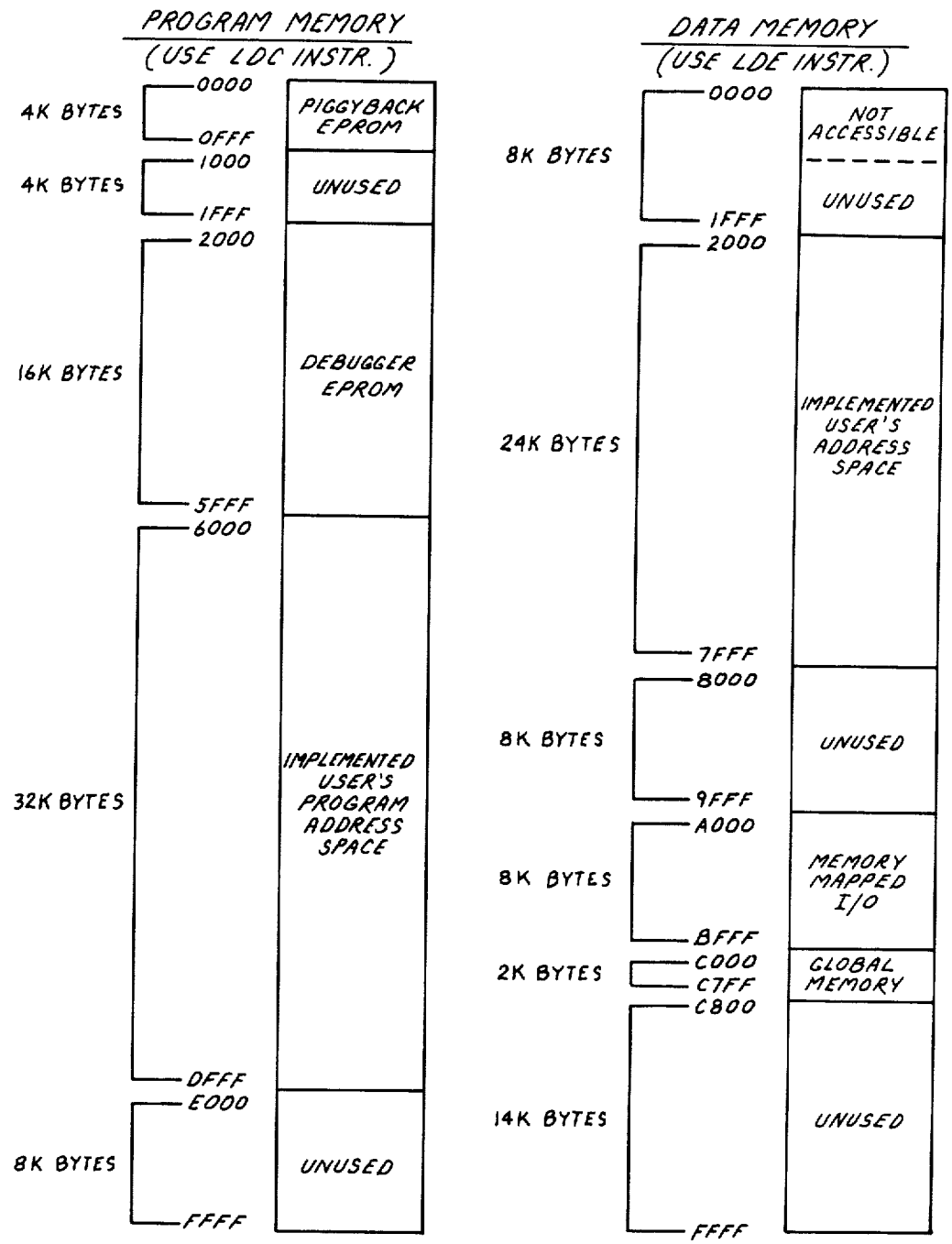

Referring to FIG. 4, there is shown the memory map for the master processor 21. Essentially, as indicated, the master processor is controlled from the timing generator 38 which may include a separate crystal oscillator for operation of the master processor 21 in the range of 8 to 12 MHz. Access to all devices external to the master processor 21 are designed as memory mapped I/O as designated in FIG. 4. Thus as shown in FIG. 4, a section of the program memory is reserved for debugging operations which are 16 K bytes. The data memory includes the codec interface, the ports for the host and user terminals 35 and 36, the status in an out registers as evidenced by the status bus 40 of FIG. 1 and the input/output used for the control bus 32 and for the global memory 23.

The local memory for the master processor 21 contains both program memory and data memory as seen in FIG. 4 which program memory is implemented in both EPROM and RAM and the data memory is RAM. Microprocessors to be employed with the system of FIG. 1 can operate from both types of local external memory without use of an extended cycle. The first 4 K bytes of the program memory operation contain the master processor onchip piggyback EPROM which contains the initialization code for the master processor. This code sets up the port modes as ports 25, 31, 32, 33 and 40 for the master processor 21.

The debugging routine is contained in 16 K bytes of EPROM. The following 32 K bytes is populated with user's program space. Two K bytes of global memory address space are provided but the memory can accommodate up to 8 K bytes. As indicated above, the master processor 21 is assigned to the left port of the dual port RAM 23. The master processor 21 has priority over the DPPE's as it has a synchronous memory access. As indicated, the master processor 21 communicates with DPPE's 10 to 13 through the global memory and via the DSP bus 18. Thus the global memory or dual port RAM 23 and the microprocessor can interrupt the DPPE's by writing into the interrupt register which is located at section 3 FF of the dual port RAM 23.

When the DPPE reads location 3 FF of the global memory 23, the interrupt is de-asserted. The DPPE can also interrupt the master processor 21 via the dual port RAM 23. The DPPE writes into the appropriate interrupt register as address 3 FF in the dual port RAM. Since the master processor 21 is a byte machine and the dual port RAM is organized as words of 2 bytes wide memories, the addressing scheme is as follows. The even address for the master processor 21 accesses the most significant bytes of the "word" and the odd address accesses the least significant byte of the "word". The codec 25 which as was explained is also an available commercial component interfaces to the master processor through a double buffered serial to parallel register 51 in the PCM or output direction and through a parallel to serial register 52 in the PCMI or input direction. The term PCM stands for pulse code modulation which as can be ascertained from the above referenced text is indicative of typical codecs as 25 which operate with pulse code modulation techniques. Sample interrupts for both the transmit and receive paths are given to the master processor 21. The double buffering in the PCMO direction gives an interrupt latency time of one sample clock for the master processor 21 to interrupt.

Depending upon whether the system of FIG. 1 is configured as a voice or a modem unit, the sample interrupts will be 8 kHz or 7.2 kHz. The analog input to the codec 25 is normally passed through a low pass filter and a differential amplifier pair for noise cancellation. The codec 25 may also contain a microphone input 55 for the development of voice algorithms. The output or analog interface of the codec consists of two single ended analog signals which are the receive analog or input I and the transmit analog or output O. These signals can interface to external analog circuitry for providing interface for handsets in the case of voice site configuration or for radio lines or telecommunication lines in the modem application.

As indicated above, the plaintext and ciphertext I/O bus 31 for the voice and modem modes are handled exclusively by the master processor 21. The plaintext receive data, PRD and the transmit PTD, data are assigned to I/O ports on the master processor 21, and the mode for each of these outputs is set by the master processor 21 initialization routine. This data is received or transmitted on the falling edges of the plaintext receive or transmit clocks respectively. These clocks are generated in the time base generator 38 or from an outside source and are input to the microprocessor as interrupts. The I/O lines that are assigned for plaintext data, PRD and PTD in the voice configuration of the system of FIG. 1 are used for ciphertext transmit and receive data, CTD and CRD, in the modem system configuation.

One of the interrupts on the master processor 21 is used as an input to the timing generator 38 which generates the variable clock output from the master processor at a 57.6 kHz average rate for the modem receiver. The time base generator 38 generates the modem transmit and receive data clocks as CTTC and CTRC. The enables for these clocks are generated by software controlled registers in the master processor 21 and are outputted on ports from the master processor. This is a well known technique. Two other interrupts to the master processor 21 are the sample transmit and receive interrupts associated with the codec 25 which are at an average rate of 7.2 kHz. The remaining timing circuitry operates from a 2.304 MHz oscillator which is contained in the time base generator 38 and is used to operate the codec 25 and related circuitry for the voice or modem systems.

Referring back to FIG. 1, the two output ports from the deuce circuit 34 to the hose computer 36 and the user terminal 35 are provided in hardware by a WD 2123 deuce chip. This chip is a standard component. An example of such a suitable chip as the WD 2123 is supplied by Western Digital Company and is referred to as dual a enhanced universal communications element. The deuce chip features two independent asynchronous full duplex data communications channels and two dependent baud rate generators which are programmable. The baud rate for both channels can, therefore, be programmed or set.

Using such a chip, the host machine or computer 36 and the user terminal 35 can each have access to the above noted system via the deuce circuit 34. The deuce circuit can be programmed in a transparent mode in which the user terminal 35 can communicate with the host machine 36. This allows a program to be created by the user on the host computer 36 and then downloaded into the master processor 21 for execution without changing the system orientation. As indicated above, the input ports for the deuce 34 are part of the memory map of the master processor. Thus the master processor 21 polls the deuce chip 34 for communication for transmitting and receiving for either channel by reading the deuce status registers associated with the host and user terminals.

The master processor 21 communicates data, program and control words to the DPPE's 10 to 13 through the global memory 23 as described above. The status bus 40 consists of a 16 bit status out register which is also part of the master processor memory map. This allows control features to be input or monitored from a location external to the system.

Figure 5:
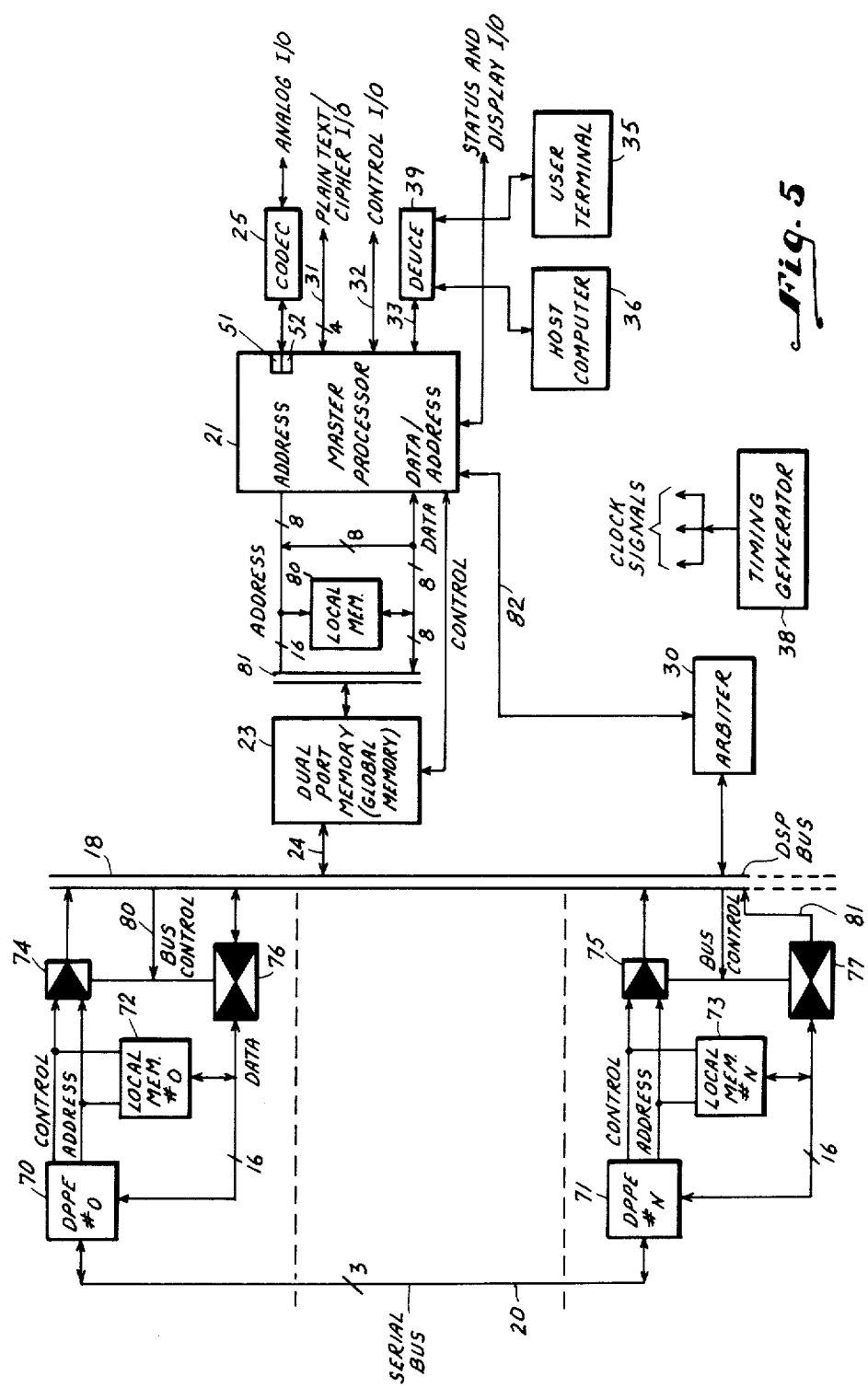
FIG. 5 is a detailed block diagram of a system employing multiple processors according to this invention.

Referring to FIG. 5, there is shown a more detailed block diagram of a modular processor system according to this invention.

In FIG. 5, there is shown a first DPPE 70 which is analogous to DPPE 10 of FIG. 1 and a second DPPE 71 designated as DPPE N. It is, of course, understood that more than two devices can be included. Essentially, as indicated, each DPPE device has its own local memory 72 for DPPE 70 and memory 73 for DPPE 71. As indicated, the local memories include a program memory and a data memory. The control and address lines for each memory are directed to the DSP bus 18 via a unidirectional buffer 74 for DPPE 70 and 75 DPPE 71. In this manner control data or address data can be impressed upon bus 18 via the buffer 74.

In a similar manner a bidirectional buffer 76 for DPPE 70 and 77 for DPPE 71 is connected via a bidirectional bus to the DSP bus 18. These control buffers as 76 and 77 are capable of receiving or transmitting data to the DSP bus 18. The control of the buffers is implemented by the bus control leads 80 and 81. In this manner, data to be received by the DPPE as 70 or 71 emanates from the DSP bus 18 via the dual port memory or global memory 23 which essentially in conjunction with the arbiter circuit 30 determines whether the DPPE is to transmit or receive data from its local memory 72. The storage of the data is determined by the DPPE transmitting control and address information via buffers 74 and 75.

In this manner the master processor 21 has complete control over the DPPE devices. Each DPPE as 70 and 71 can communicate with one another via the serial bux 20 and, therefore, can effect the transfer of arithmetic data or arithmetic results to an idle DPPE to implement further processing beyond that which a single DPPE is capable of performing. This may be done without knowledge of the master processor 21, but the information in regard to such a transfer from serial bus 20 is relayed to the dual port RAM 23 from which it is read by the master processor, 21. The master processor 21 also includes its own local memory 80 which memory interfaces with the dual port memory 23 via an input/output bus 81. The input/output bus 81 accommodates address for the local memory 80 as well as data, while control for the dual port memory 23 is directed via the control bus 82 which essentially is a separate bus which interfaces with the control bus of the dual port memory 23. The remaining interface units are also shown in FIG. 5 with the same reference numerals employed as in FIG. 1.

Thus according to the above described system as shown in FIGS. 1 and 5, one can now accommodate extremely complicated mathematical functions particularly adapted for use in digital signal processing and to allow the system to be utilized as a voice processor or a modem processor with a controllable clock to implement various bit rates as high bit rates or low bit rates. The configuration results in a substantial reduction of components as compared to prior art systems. First the DPPE devices can operate from external program memory and can download to onchip program memory under control of the master processor. Thus one can achieve direct addressing of the external data memory while multiprocessing of I/O and I/O handling are provided by the master processor with data being processed by the DPPE's. This eliminates the need for excessive external control circuitry which is necessary when using conventional chips in prior configurations.

There is a reduction in cost of the system because of a reduction in the number of components needed based on the system architecture. The system can be easily expanded to accommodate more processors as more DPPE's to, therefore, be capable of extensive arithmetic computation utilizing large bit numbers. The device is expandable to accommodate more modes of operation by adding more memory. This can be done since the programs in the additional memory can be donwloaed into the DPPE's for execution at the maximum rate. In implementing the above noted structure, the following components were employed to create the system shown in FIGS. 1 to 5. A DPPE device which can be employed for DPPE's 10 to 13 is described in U.S. Pat. No. 4,439,839.

In any event, a suitable device is manufactured by Texas Instruments of Dallas, Tex. and designated as the TI 32020 which is referred to as a digital signal processor but essentially is a dynamically programmable processing element. The master processor as 21 is a Z8613 microcomputer such as that manufactured and sold by the Zilog Company. A suitable dual port RAM device 23 is designated as the SY 2130 also available from the Synertek or IDT or from other suppliers as well. The codec 25 is manufactured by many companies including AMI and sold under the designation as the 3507. The deuce circuit 34 is a device supplied by Western Digital Company as the WD 2133. The remaining circuits such as the time base generator is a conventional clock circuit which may consist of a plurality of binary counter chains operated in conjunction with crystal controlled oscillators to provide inputs to the counters to allow the counters to divide by any given interger to produce any clock cycle desired.

It will be understood by those skilled in the art that many modifications can be made such as for example the codec 25 which supplies the analog I/O to the master processor can be coupled into the DSP bus directly and hence the codec signals processed directly by the DPPE devices rather than by the master processor. In a similar manner one may remove the dual port memory 23 by allowing the master processor 21 to write directly into the local memories are memories 72 and 73 (FIG. 5) of the DPPE devices.

In any event, it is also a major objective of the structure to allow easy debugging and testing. In this manner, the structure allows a programmer to follow logic flow in a simple manner to, therefore, render the system operational with a minimum of effort.

As indicated above, the architecture has great utility in performing digital signal processing which processing techniques would normally exceed the capabilities of conventional processors commercially available. The processor also allows one to solve complicated algorithms which cannot be conventionally implemented even on large computer systems due to the lack of real-time execution speed. Thus the processing can be performed with extremely high through-put such as that required in low bit rate speech algorithms. It is further indicated that the system is extremely simple to implement due to the uniformity of structure and the sharing of functions between the DPPE devices and the master processor.

What is claimed is:

1. A multiple processor apparatus particularly adapted for use in providing digital signals according to complicated algorithms, comprising:

a plurality of dynamically programmable processing elements (DPPE) means, each capable of processing input data in accordance with arithmetic computations to be performed on said data, and each having a bidirectional input/output port and a second bidirectional input/output port, a first bus coupled between said input/output ports of said DPPE's for enabling transfer of data between each of said plurality of DPPE elements, a second digital signal processing bus coupled to the second input/output ports of said plurality of DPPE element means, global memory means having an input/output port coupled to said second bus, and a second input/output port a master processor having a bidirectional input/output port coupled to said second input/output of said global memory for controlling the data to be transmitted via said memory means to said second bus and for receiving data from said second bus as processed by said DPPE's, said master processor having a plurality of bidirectional input/output lines for selectively receiving or transmitting data and for controlling the status of said lines according to the arithmetic computations performed by said plurality of DPPE's.

2. The multiple processor apparatus according to claim 1, wherein said first bus is a bidirectional serial bus coupled to said input/output ports of said DPPE's.

3. The multiple processor apparatus according to claim 1, wherein each of said DPPE element means includes a separate local memory having control and address outputs with first buffer means for coupling said control and address outputs to said second bus.

4. The multiple processor apparatus according to claim 3, wherein said local memory further includes a data input/output bus and second buffer means for coupling said data input/output bus to said second bus.

5. The multiple processor according to claim 4, further including bus control means coupled to said second bus and operative to select either said first or second buffer means for coupling said associated outputs to said second bus.

6. The multiple processor apparatus according to claim 1, further including arbiter means coupled to said master processor and said second bus for determining access to said bus by a DPPE element or said master processor.

7. The multiple processor apparatus according to claim 1, wherein said global memory means is a dual port random access memory having a right port coupled to said master processor and a left port coupled to said second bus.

8. The multiple processor apparatus according to claim 1, wherein one of said bidirectional outputs of said master processor is coupled to the input of a codec having a bidirectional input/output bus for receiving or transmitting analog signals under the control of said master processor.

9. The multiple processor apparatus according to claim 1, wherein one of said bidirectional outputs of said master processor is a plaintext or ciphertext bus for transmitting plaintext data or ciphertext under control of said master processor.

10. The multiple processor apparatus according to claim 1, wherein one of said bidirectional outputs of said master processor is an input/output control bus for receiving or transmitting control data under control of said master processor.

11. The multiple processor apparatus according to claim 1, wherein one of said bidirectional outputs of said master processor is an input/output status and display bus for transmitting and receiving data indicative of the status of said master processor and under the control of said master processor.

12. The multiple processor apparatus according to claim 1, wherein one of said bidirectional outputs of said master processor is an interface bus coupled to a host computer and a user terminal.

13. The multiple processor apparatus according to claim 12, wherein said output of said bidirectional line is coupled to the input of a dual communications element having one output coupled to said host computer and another output coupled to said user terminal.

14. The multiple processor apparatus according to claim 1, further including timing generator means for providing a plurality of clock signals connected to said DPPE's and said master processor.

15. The multiple processor apparatus according to claim 1, wherein said master processor includes a memory which is synchronously operated.

16. The multiple processor apparatus according to claim 3, wherein said local DPPE memory is asynchronuosly operated.

17. The multiple processor apparatus according to claim 15, wherein said master processor memory includes a first RAM section and a second EPROM section.

18. The multiple processor apparatus according to claim 16, wherein said local DPPE memory contains a first RAM section and a second EPROM section.

19. The multiple processor apparatus according to claim 17, wherein said master processor memory has a said first RAM section for data storage and said second EPROM section for program storage.

20. The multiple processor apparatus according to claim 18, wherein said local DPPE memory has said first RAM section for data storage and said second EPROM section for program storage.

* * * * *